United States Patent [19]

Kudo et al.

[11] 3,929,670
[45] Dec. 30, 1975

[54] CATALYST

[75] Inventors: Tetsuichi Kudo, Tokyo; Tetsuo Gejyo, Tokyo; Kazuetsu Yoshida, Kokubunji; Michiharu Seki, Fuchu, all of Japan

[73] Assignee: Hitachi, Ltd., Japan

[22] Filed: Aug. 24, 1973

[21] Appl. No.: 391,244

[30] Foreign Application Priority Data

Aug. 25, 1972 Japan................................. 47-84543

[52] U.S. Cl.............. 252/455 R; 252/462; 423/213
[51] Int. Cl.².......................................... B01J 29/06
[58] Field of Search....................... 252/455 R, 462

[56] References Cited
UNITED STATES PATENTS

| | | | |
|---|---|---|---|
| 2,204,733 | 6/1940 | Miller | 252/462 X |
| 3,524,721 | 8/1970 | Stephens | 252/462 X |
| 3,776,859 | 12/1973 | Simpson | 252/462 |
| 3,781,406 | 12/1973 | Roth et al. | 252/462 X |

*Primary Examiner*—Paul F. Shaver
*Attorney, Agent, or Firm*—Craig & Antonelli

[57] ABSTRACT

A catalyst suitable for reducing nitrogen oxides, for oxidizing combustible gases contained in the exhaust gas from internal combustion engines, boilers, etc., and for chemical production processes conducted on an industrial scale, for example, production of ethylene oxide from ethylene consists essentially of a metal oxide composition represented by the following general formula $$La_{2-x}A_xCu_{1-y}M_yO_4$$

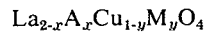

wherein A is at least one member selected from the group consisting of lanthanides, yttrium and alkaline earth metals, (Ca, Sr and Ba) M is at least one member selected from the group consisting of lithium, aluminum, titanium, vanadium, chromium, manganese, iron, cobalt, nickel, zinc, gallium, zirconium, tin, molybdenum and tungsten, x is a number satisfying the requirement of $0 \leq x \leq 2$, and y is a number satisfying the requirement of $0 \leq y < 1$.

19 Claims, 1 Drawing Figure

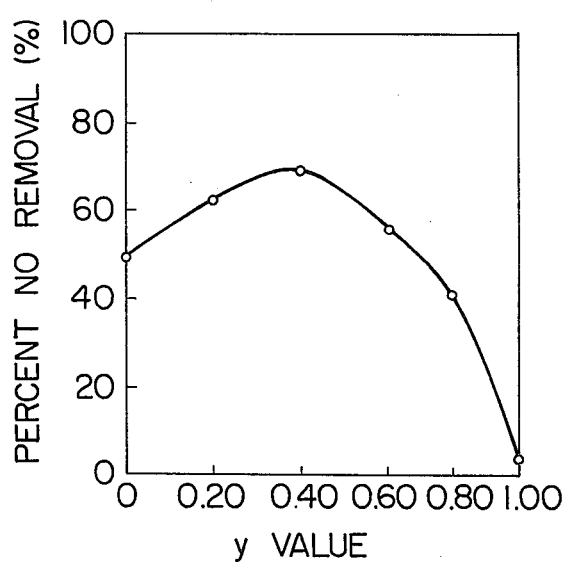

CATALYST

BACKGROUND OF THE INVENTION

This invention relates to a catalyst composition for use as a catalyst for the redox reaction of gases and as a catalyst for the air electrode reaction in fuel cells. For example, an exhaust gas from an internal combustion engine, a boiler or the like contains nitrogen oxides and combustible gases such as carbon monoxide, hydrocarbons and partially oxidized hydrocarbons which are products of incomplete oxidation.

It has been reported that nitrogen oxides in the presence of sunlight lead to ozone formation and the resulting ozone reacts with hydrocarbon substituents in the atomsphere to form noxious materials.

Therefore, extensive research works have been made on means for removing precursor materials, nitrogen oxides and hydrocarbons from the atmosphere.

One of the well known means is a method for removing nitrogen oxides including nitrogen monoxide (NO) as a typical component by contacting a nitrogen oxide-containing exhaust gas with a reducing agent. The reaction of NO proceeds in the presence of a reducing gas such as carbon monoxide, hydrogen, hydrocarbon or ammonia according to the following reaction equations, so that nitrogen gas, carbon dioxide and water vapor are formed as products harmless to the biological world, but the rate of such reaction is very low in the absence of a catalyst:

$$NO + CO \rightarrow \tfrac{1}{2}N_2 + CO_2$$

$$NO + \tfrac{2}{3}NH_3 \rightarrow 5/6 N_2 + H_2O$$

$$NO + \tfrac{1}{4}CH_4 \rightarrow N_2 + \tfrac{1}{4}CO_2 + \tfrac{1}{2}H_2O$$

It is known that catalysts for such reactions include metal oxides such as $Fe_2O_3$, $Cu_2O$ and rare earth metal oxides, and noble metals such as platinum (Pt) and palladium (Pd), etc.

However, such metal oxide catalysts so far well known have the following disadvantages:
1. The catalyst life is short.
2. NO reducing efficiency is much decreased in the presence of oxygen.
3. The catalyst is deactivated or the catalyst activity is lost when used at a temperature higher than 800°C., and therefore, it is impossible to apply the catalyst to cleaning of an exhaust gas discharged from automobiles.

Furthermore, noble metal catalysts such as Pt, Pd, etc. have the following disadvantages:
1. The catalyst is expensive.
2. The catalyst is poisoned or the catalyst activity is lost by lead or a lead compound, if an exhaust gas contains lead or lead compound.
3. The catalyst is deactivated or the catalyst activity is lost when used at a temperature higher than 700°C.

Therefore, any of heretofore known catalysts is not practically used.

SUMMARY OF THE INVENTION

It is a primary object of this invention to provide a catalyst composition suitable for use as (i) a catalyst for reducing nitrogen oxides which are contained in an exhaust gas from an automobile or a boiler and are typical substances causing atmosphere pollution, (ii) a catalyst for oxidizing mainly CO and hydrocarbons contained in an exhaust gas from an automobile, (iii) a catalyst for the chemical industry, e.g., for the production of ethylene oxide from ethylene and (iv) an electrode reaction catalyst to be employed for a fuel cell or the like.

The catalyst of this invention is a novel catalyst which can overcome substantially the defects and disadvantages of the abovementioned conventionl, catalysts and contains copper which is available at a low cost. This catalyst is a composite metal oxide expressed by the following general formula:

$$La_{2-x}A_xCu_{1-y}M_yO_4$$

wherein A is at least one element selected from the group consisting of lanthanides (i.e. rare earths of the lanthanide series) of an atomic number of from 59 to 71, yttrium and alkaline earth metals such as Ba, Sr, and Ca, M is at least one element selected from the group consisting of lithium, aluminum, titanium, vanadium, chromium, manganese, iron, cobalt, nickel, zinc, gallium, zirconium, tin, molybdenum and tungsten, x is a number defined by the relationship $0 \leq x \leq 2$, and y is a number defined by the relationship of $0 \leq y < 1$.

When this metal oxide composition is actually used as the redox catalyst, it takes a form that can be expressed by the following formula:

$$La_{2-x}A_xCu_{1-y}M_yO_{4-\delta}$$

wherein delta "$\delta$" indicates the non-stoichiometric property of oxygen and although this value varies depending on the catalyst-forming conditions and the reaction conditions, it is inevitably within a range of from $-0.5$ to $+0.5$.

When the kind of the element A or M or the value of x or y in the above formula is changed appropriately, the catalyst of this invention is applicable to not only the NO reducing reaction but also the gas phase oxidation represented by the following reaction equations:

$$CO + 1/2 O_2 \rightarrow CO_2$$

$$CH_4 + 2O_2 \rightarrow CO_2 + 2 H_2O \text{ and}$$

$$CH_3CH_2CH_3 + 1/2 O_2 \rightarrow CH_3CHOCH_2$$

and the electrode reaction such as the air electrode reaction expressed by the following reaction equation:

$$1/2 O_2 + H_2O + 2e \rightarrow 2OH^-$$

In case the catalyst of this invention is employed for removing nitrogen oxides and combustible gases from an exhaust gas or for synthesis in the chemical industry, it can be generally used at temperatures ranging from 200° to 1000°C. In case the catalyst of this invention is employed as an electrode reaction catalyst, sufficient results can be obtained when the temperature is maintained within a range of from 0° to 150°C.

The metal oxide composition represented by the above general formula, which constitutes the catalyst of this invention, can be obtained by heating a homogeneous mixture of various salts containing the component elements, for example, nitrates, acetates, oxalates, carbonates or chlorides of component elements, at a temperature of 700° to 1000°C. for 0.5 to 2 hours in the air. It is preferred that the resulting powder of the metal oxide composition is shaped into pellets and these pellets are sintered when used as a catalyst.

As is usually conducted in the art of prepartion of catalysts, ceramics such as alumina, silica, zirconia, magnesia, thoria and the like can be used as supports for the metal oxide composition of this invention, if desired, so far as such ceramics do not react with the metal oxide composition of this invention.

More specifically, the metal oxide composition of this invention can be formed on a ceramic support and effectively used as a supported catalyst. From the economical viewpoint and in view of the mechanical strength, it is desired that the metal oxide composition of this invention is used in the form of a support catalyst.

The copper-containing metal oxide composition of this invention represented by the above general formula has a crystal structure same as that of $K_2MgF_4$, that belongs to a tetragonal system or is a little deviated from this system. Its space group is 14/mmm.

La or the element A occupies a lattice point corresponding to that of K in the $K_2MgF_4$ crystal, Cu or the element M occupies a lattice point corresponding to that of Mg in the $K_2MgF_4$ crystal, and O occupies a lattice point corresponding to that of F in the $K_2MgF_4$ crystal.

As is seen from the above general formula, the lattice point of La is replaced by the element A and the lattice point of Cu is substituted by the element M. As pointed above, the substitution amount (x) of the element A is within a range of from 0 to 2, and La can be completely substituted or replaced by the element represented by A. In case La is completely substituted by one element A, it is preferred that the element A is selected from the group consisting of Pr, Nb, Pm, Sm, Eu and Gd.

Also, as is seen from the above general formula, the substitution amount (y) of the element represented by B is within a range of $0 \leq y < 1$, and it is preferred that the value of y is within a range of from 0 to 0.7, especially 0.2 to 0.6. Preferable examples of the element represented by M are Zr, Ni, Mn, Cr, Fe, Co, Sn, W, Mo, Al, Zn and Li.

BRIEF DESCRIPTION OF THE DRAWING

The accompanying drawing is a graph illustrating the relation between the value of y and the decomposition ratio of nitrogen monoxide (NO) is one embodiment of the metal oxide composition represented by the formula $La_2Cu_{1-y}(Ni_{0.5}Co_{0.5})_yO_4$.

DESCRIPTION OF THE PREFERRED EMBODIMENTS

EXAMPLE 1

2 moles of lanthanum acetate and 1 mole of copper acetate were dissolved in 5 liters of warm water, and dehydration was conducted under a reduced pressure with stirring. The resulting homogeneous mixture of lanthanum acetate and copper acetate was heated at 850°C. in an air atmosphere, maintained at this temperature for 1 hour, and then cooled to room temperature. To the resulting powdery composite oxide ($La_2CuO_4$) having a crystal structure of the $K_2MgF_4$ type was added a 10% aqueous solution of polyvinyl alcohol in an amount of 20 g per 100 g of the powder. The resulting mixture was thoroughly kneaded, and then dried at 100°C. Then, the dried mixture was pulverized and sieved to obtain uniform particles having a size of about 60 mesh. The particles were shaped into columnar pellets having a diameter of 3 mm and a height of 2.5 mm by means of a pelletizer. The resulting pellets were sintered at 900°C. for 30 minutes to obtain pellets having a porosity of 56 percent. The so obtained pellets of the metal oxide composition is packed into a catalyst layer, and a nitrogen gas containing 2000 ppm of nitrogen monoxide (NO), 3000 ppm of carbon monoxide (CO) and 3000 ppm of oxygen was passed through the packed layer at a space velocity (SV) of 20,000 hr$^{-1}$. The NO concentration at an outlet of the catalyst packed layer was measured, and the percent removal of NO was calculated according to the following formula:

Percent No removal (%) = (1 − C/Co) × 100 wherein Co is the NO concentration at the inlet of the catalyst packed layer, and C is the NO concentration at the outlet of the catalyst packed layer.

The percent removal of NO at various temperatures is as shown in Table 1 given below.

Table 1

| Catalyst Layer Temperature(°C.) | Percent NO Removal (%) |
|---|---|
| 200 | 75 |
| 300 | 95 |
| 400 | 100 |
| 500 | 100 |
| 900 | 100 |

As shown in Table 1, good percent removal was obtained in a wide temperature range of 200° to 900°C., and at a temperature of 400° to 900°C., NO was completely reduced to $N_2$ and $CO_2$.

No change in results was observed even after the catalyst had been continuously used for 800 hours at 350°C.

EXAMPLE 2

Composite metal oxide catalysts, $La_2Cu_{0.9}Al_{0.1}O_4$ and $La_2Cu_{0.9}Zr_{0.1}O_4$, of the $K_2MgF_4$ crystal type were synthesized according to the same method as adopted in Example 1, and sintered pellets of these metal oxide compositions (formed in the same manner as in Example 1) were tested on the catalytic activity to the following reaction:

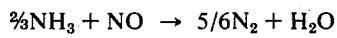

More specifically, a nitrogen gas containing 2000 ppm of $NH_3$, 2000 ppm of NO, and 5000 ppm of $O_2$ was passed at a space velocity of 5000 hr$^{-1}$ through a layer packed with the metal oxide composition pellets, and the percent NO removal (as defined in Example 1) was determined. When the catalyst layer was maintained at 250°C., the percent NO removal was 100 percent in the case of either $La_2Cu_{0.9}Al_{0.1}O_4$ or $La_2Cu_{0.9}Zr_{0.1}O_4$. Also in the case of $La_2CuO_4$ illustrated in Example 1, NO was reduced to $NH_3$ sufficiently promptly at 250°C. in the absence of oxygen, but when oxygen was contained in the starting gas at a concentration of about 5000 ppm, the following reaction:

was simultaneously caused to advance, the the percent NO removal was reduced to 70 percent. In other words, in the metal oxide composition of this invention, when a part of copper is replaced by an element which readily takes a tri-valent or tetra-valent form, such as Al and Zr, it is possible to allow the following reaction to proceed preferentially:

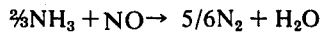

Accordingly, when the catalyst of this invention is used for reducing NO, it is preferred that the catalyst has the following composition:

$$La_2Cu_{1-y}M_yO_4$$

in which y is as defined above and M is a tri-valent or tetra-valent element of those heretofore described such as Al and Zr.

EXAMPLE 3

With respect to a catalyst, $La_2Cu_{1-y}(Ni_{0.5}Co_{0.5})_yO_4$, prepared in the same manner as described in Example 1, the relation between the value of y and the NO decomposition ratio (percent removal) is shown in the drawing. The gas to be contacted with the catalyst layer was a nitrogen gas containing 1000 ppm of nitrogen monoxide. This gas was passed through the catalyst layer at a space velocity of 5000 hr$^{-1}$, and the catalyst layer was maintained at 450°C. NO was decomposed according to the following chemical equation:

$$NO \rightarrow \frac{1}{2}N_2 + 1/2O_2$$

The obtained results are plotted on the graph in the drawing. This graph illustrates the influence of substitution of a part of Cu by the element M on the NO decomposing activity of the catalyst. As is seen from the graph, if Cu is substituted by a suitable element M, even if the substitution amount is small, a preferred result can be correspondingly obtained. The effect is at its maximum when the substitution amount (y) is about 0.4 and when the value y exceeds this point, the effect is gradually lowered. But, when the value y is not greater than 0.7, a certain effect is attained by substitution of Cu by the element M. When the value y exceeds 0.7, no effect is attained by the substitution and the catalyst activity is rather lowered. However, even when the value y exceeds 0.7, if the value is smaller than 1, namely Cu is present in the metal oxide composition, the catalyst can attain tentatively the intended object, though the activity is low. In view of the foregoing, in this invention, it is specified that y is a number within a range of $0 \leq y < 1$. As is seen from the graph of FIG. 1, it is preferred that the value y is from about 0.2 to about 0.6, and most preferred value of y is about 0.4.

EXAMPLE 4

Sintered pellets of $Gd_2CuO_4$ synthesized according to the same method as adopted in Example 1 were packed in a catalyst layer and a boiler exhaust gas containing 1000 ppm of NO, 1000 ppm of $NH_3$, 10000 ppm of $O_2$, 1000 ppm of $SO_2$, 15% of $CO_2$ and 10% of $H_2O$ with the balance being $N_2$ was passed through the packed layer at a space velocity of 5000 hr$^{+1}$ at a catalyst layer temperature of 200°C. The percent NO removal was found to be 98%. This value was not changed even after the catalyst had been used continuously for 1000 hours under the above conditions. From this fact, it will readily be understood that the catalyst was not poisoned by $SO_2$ or $CO_2$.

EXAMPLE 5

1 mole of lanthanum acetate, 0.2 mole of neodymium acetate, 0.2 mole of praseodymium acetate, 0.2 mole of samarium acetate, 0.2 mole of gadolinium acetate, 0.2 mole of yttrium acetate, 0.9 mole of copper acetate and 0.1 mole of zinc acetate were dissolved in 5 liters of warm water. The resulting solution was cooled and oxalic acid was added thereto to precipitate ingredient elements in the form of oxalates. The resulting oxalate mixture was sintered at 1000°C. for 1 hour to obtain a composite metal oxide of the $K_2MgF_4$ crystal type having a composition expressed by the formula $La_{1.0}Nd_{0.2}Pr_{0.2}Sm_{0.2}Gd_{0.2}Y_{0.2}Cu_{0.9}Zn_{0.1}O_4$. This was formed into a pelletized catalyst in the same manner as adopted in Example 1. The activity of the catalyst to the following reaction:

$$NO + CO \rightarrow \frac{1}{2}N_2 + CO_2$$

was examined according to the same method as adopted in Example 1. As a result it was found that the lowest temperature at which the percent NO removal was 100% was 280°C.

EXAMPLE 6

In this Example, combustible gases contained in an exhaust gas was oxidized and removed. A hydrocarbon ($CH_4$) and carbon monoxide (CO) were employed as instances of combustible gases.

A composite metal oxide, $La_2Cu_{0.9}Li_{0.1}O_4$, of the $K_2MgF_4$ crystal type was synthesized according to the same method as in Example 1, and this composite metal oxide was formed into a pelletized catalyst in the same manner as in Example 1. A gaseous mixture containing 3000 ppm of $CH_4$, 1000 ppm of Co and 15000 ppm of $O_2$ with the balance being $N_2$ was passed through a layer packed with the so formed catalyst and maintained at 200° to 225°C. at a space velocity of 25000 hr$^{-1}$. As a result of the analysis of the outlet gas, it was found that the $CH_4$ concentration was 2 ppm and the CO concentration was 21 ppm. Namely, it is considered that more than 99% each of $CH_4$ and CO was removed according to the following reactions:

$$CH_4 + 2O_2 \rightarrow 2H_2O + CO_2$$

$$CO + 1/2O_2 \rightarrow CO_2$$

EXAMPLE 7

This Example illustrates an embodiment where the catalyst of this invention was used for chemical synthesis by a gas phase reaction.

1 mole of neodymium acetate, 0.7 mole of lanthanum acetate, 0.3 mole of strontium acetate, 0.5 mole of copper acetate, 0.4 mole of nickel acetate and 0.1 mole of lithium acetate were dissolved in 5 liters of water. Oxalic acid was added to the resulting solution to precipitate each ingredient element in the form of an oxalate. The oxalate precipitate was separated from water by the centrifugal separation, and recovered precipitate was frozen by liquid nitrogen. The frozen precipitate was dried in vacuo and sintered at 700°C. for 1 hour to obtain a composite metal oxide, $NdLa_{0.7}Sr_{0.3}Cu_{0.5}Ni_{0.4}Li_{0.1}O_4$, of the $K_2MgF_4$ crystal type. The composite metal oxide powder obtained by the above freeze-drying method had a specific surface area of 27 m$^2$/g, which value is much higher than that of a product synthesized by an ordinary synthesis method. When ethylene oxide was prepared from ethylene by the air oxidation with use of the so obtained catalyst, it was found that the instant catalyst was excellent over a conventional silver oxide catalyst heretofore used for this reaction with respect to the catalytic activity and property and the manufacturing and running costs.

EXAMPLE 8

A powdery composite metal oxide, $LaNdCu_{0.4}Ni_{0.4}Li_{0.2}O_4$ of the $K_2MgF_4$ crystal structure according to the same method as described in Example 7. Nickel carbonyl powder was added to this composite metal oxide powder in an amount of 5 g per 5 g of the composite metal oxide, and the blend was well mixed. Then, 60 ml of an aqueous dispersion of polytetrafluoroethylene having a solid content of 20% was added to the mixture, and the resulting mixture was well agitated. The powders of the composite metal oxide and nickel component were coagulated by particles of polytetrafluoroethylene. The resulting coagulated slurry was coated on a nickel net in an amount of 75 to 80 mg per cm² of the net, and the coated net was placed under application of a pressure of 500 Kg/cm² and was heat-treated at 250°C. The air electrode reaction was conducted in an electrolyte of 15% KOH by employing the so formed electrode as an air electrode. The open-circuit voltage at 25°C. was + 0.25 V with respect to a mercury oxide reference electrode, and when an electric current was taken out at a current density of 100 mA/cm², the potential of this electrode to a mercury oxide reference electrode was −0.05 V. As compared with conventional air electrodes, this electrode exhibited a higher voltage (namely better operation characteristics) in either the open or closed state. This shows that the catalyst of this invention is effective for the air electrode reaction reprsented by the following reaction formula:

$$1/2O_2 + H_2O + 2e \rightarrow 2OH^-$$

EXAMPLE 9

2 moles of gadolinium acetate and 1 mole of copper acetate were dissolved in 4 liters of warm water, and alumina spheres having a diameter of 3 mm were immersed as a catalyst carrier in the resulting solution for about 10 hours. The acetate-impregnated alumina carrier was sintered at 900°C. for 2 hours to form a layer of $Gd_2CuO_4$ on the alumina carrier. In the same manner as above, a layer having a high mechanical strength could be formed on ceramic supports such as alumina-silica, zirconia and magnesia. A gaseous mixture containing 1000 ppm of NO, 1 % of CO and 0.5% of $O_2$ with the balance being $N_2$ was passed through a catalyst layer packed with such supported catalyst and maintained at 250°C. at a space velocity of 20000 hr⁻¹. The outlet gas was analyzed and the percent NO removal was determined to obtain results shown in Table 2. Data of a platinum catalyst supported on alumina were also given in Table 2 for the sake of comparison.

Table 2

| Ceramic support | Catalyst | Percent NO Removal (%) |
|---|---|---|
| alumina | $Gd_2CuO_4$ | 100 |
| zirconia | $Gd_2CuO_4$ | 100 |
| alumina-silica | $Gd_2CuO_4$ | 95 |
| magnesia | $Gd_2CuO_4$ | 98 |
| alumina | Pt | 78 (comparison) |

EXAMPLE 10

The $Gd_2CuO_4$ catalyst supported on alumina prepared in Example 9 was packed in a stainless steel tube having a diameter of 50 mm and a length of 150 mm, and the packed tube was attached to an exhaust opening of a 4-cycle gasoline engine of an exhaust capacity of about 1000 cc, and the NO concentration at the outlet of the catalyst-packed tube was determined when the engine was operated at a rotation rate of 2000 rpm. As a result, it was found that the NO concentration was 5 ppm, which value was about 1/120 of the value obtained when no catalyst was employed. The activity was not changed even after running of 20000 Km.

EXAMPLES 11 to 19

Catalysts indicated in Table 3 given below were prepared, and their catalytic properties were tested under conditions indicated in Table 3 to obtain results shown in Table 3.

Table 3

| Example No. | Catalyst Composition | Reaction Equation | Service Temperature (°C.) | Working Conditions and Catalyst Efficiency | Preparation and Characteristics of Catalyst |
|---|---|---|---|---|---|
| 11 | $La_2Cu_{0.99}Ga_{0.01}O_4$ | $6NO+4NH_3 \rightarrow 5N_2+6H_2O$ | 200–400 | $N_2$ gas containing 1000 ppm NO, 800 ppm $NH_3$ and 1% $O_2$; SV=10⁴hr⁻¹; percent NO removal = 88% (at 350°C.) | supported on γ-alumina (supported amount=5%); prepared in the same manner as in Ex. 1 |
| 12 | $La_2Cu_{0.97}Ni_{0.02}Ti_{0.01}O_4$ | $NO+CO \rightarrow 1/2N_2+CO_2$ | 250–700 | $N_2$ gas containing 1000 ppm NO, 2000 ppmCO and 1.5%$O_2$; SV=10⁴hr⁻¹; percent NO removal = 88% (at 300°C.) | ditto |
| 13 | $La_2Cu_{0.99}Mn_{0.01}O_4$ | ditto | ditto | reaction conditions were same as in Example 12; percent NO removal = 85% (at 300°C.) | ditto |
| 14 | $La_{1.5}Sr_{0.5}Cu_{0.05}Ni_{0.9}Cr_{0.05}O_4$ | $1/2O_2+H_2O+2e \rightarrow 2O-H^{-1}$ | 0–150 | air electrode, 25% aqueous KOH (electrolyte); more than −0.05V to Hg/HgO at 50 mA/cm² | same as in Ex. 8 |
| 15 | $La_{1.5}Sr_{0.5}Cu_{0.5}Ni_{0.4}V_{0.1}O_4$ | $CO+1/2O_2 \rightarrow CO_2$ | 200–800 | $N_2$ gas containing 1% CO, and 15% $O_2$; SV=10⁴ hr⁻¹; percent CO removal =90% (at 250°C.) | sintered catalyst prepared in the same manner as in Ex. 1; V derived from ammonium vanadate |
| 16 | $La_2Cu_{0.5}Ni_{0.4}Fe_{0.1}O_4$ | $NO \rightarrow 1/2N_2+1/2O_2$ | 300–1000 | $N_2$ gas containing 1000 ppm NO;SV=5000 hr⁻¹; percent NO removal=70% (at 460°C.) | sintered catalyst prepared in the same manner as in Ex. 1; Fe derived from iron citrate |
| 17 | $La_2Cu_{0.1}Co_{0.5}Ni_{0.4}O_4$ | ditto | 250–1000 | reaction conditions same as in Example 16; percent NO removal = 65% (at 400°C.) | sintered catalyst prepared in the same manner as in Ex. 1 |
| 18 | $La_2Cu_{0.95}Sn_{0.05}O_4$ | $6NO+4NH_3 \rightarrow 5N_2+6H_2O$ | 200–450 | $N_2$ gas containing 1000 ppm NO, 750 ppm $NH_3$, 3% $O_2$ and 10% $H_2O$; SV=10⁴ hr⁻¹; percent NO removal =97% (at 350°C.) | ditto |

Table 3-continued

| Example No. | Catalyst Composition | Reaction Equation | Service Temperature (°C.) | Working Conditions and Catalyst Efficiency | Preparation and Characteristics of Catalyst |
|---|---|---|---|---|---|
| 19 | $La_2Cu_{0.95}W_{0.03}Mo_{0.02}O_4$ | ditto | ditto | reaction conditions were same as in Example 18; percent NO removal =98% (at 350°C.) | ditto |

What is claimed is:

1. A catalyst consisting essentially of a metal oxide composition represented by the general formula:

$$La_{2-x}A_xCu_{1-y}M_yO_4$$

wherein A is at least one element selected from the group consisting of lanthanides of an atomic number of from 59 to 71, yttrium and alkaline earth metals, B is at least one element selected from the group consisting of lithium, aluminum, titanium, vanadium, chromium, manganese, iron, cobalt, nickel, zinc, gallium, zirconium, tin, molybdenum and tungsten, x is a number defined by $0 \leq x \leq 2$, and y is a number defined by $0 < y < 1$.

2. The catalyst according to claim 1, wherein the metal oxide composition has a crystal structure of the $K_2MgF_4$ type.

3. The catalyst according to claim 1, wherein the metal oxide composition is supported on a ceramic support.

4. The catalyst according to claim 3, wherein the ceramic support is a member selected from the group consisting of alumina, zirconia, magnesia, silica, alumina-silica and thoria.

5. A catalyst suitable as a gas cleaning agent for an exhaust gas containing nitrogen oxides and/or combustible gases, which consists essentially of a metal oxide composition represented by the general formula:

$$La_2Cu_{1-y}M_yO_4$$

wherein M is at least one element selected from the group consisting of aluminum and zirconium, and y is a number of from 0.2 to 0.6.

6. The catalyst according to claim 2, wherein x is greater than 0.

7. The catalyst according to claim 6, wherein the metal composition is supported on a ceramic support.

8. The catalyst according to claim 6, wherein M is aluminum.

9. The catalyst according to claim 6, wherein M is zirconium.

10. The catalyst according to claim 7, wherein the ceramic support is a member selected from the group consisting of alumina, zirconia, magnesia, silica, alumina-silica and thoria.

11. The catalyst according to claim 2, wherein the metal oxide composition is supported on a ceramic support.

12. The catalyst according to claim 11, wherein the ceramic support is a member selected from the group consisting of alumina, zirconia, magnesia, silica, alumina-silica and thoria.

13. The catalyst according to claim 2, wherein $x$ is 2, and further wherein A is selected from the group consisting of Pr, Nb, Pm, Sm, Eu and Gd.

14. The catalyst according to claim 2, wherein M is selected from the group consisting of Zr, Ni, Mn, Cr, Fe, Co, Sn, W, Mo, Al, Zn and Li.

15. The catalyst according to claim 2, wherein y is about 0.2 to 0.6.

16. The catalyst according to claim 2, wherein M is at least two elements selected from the group consisting of lithium, aluminum, titanium, vanadium, chromium, manganese, iron, cobalt, nickel, zinc, gallium, zirconium, tin, molybdenum and tungsten.

17. The catalyst according to claim 16, wherein A is at least two elements selected from the group consisting of lanthanides having an atomic number of 59 to 71, yttrium and alkaline earth metals.

18. The catalyst of claim 2, wherein M is aluminum.

19. The catalyst according to claim 5, wherein the metal oxide composition has a crystal structure of the $K_2MgF_4$ type.

* * * * *